United States Patent
Fukuda et al.

(10) Patent No.: US 7,209,863 B2
(45) Date of Patent: Apr. 24, 2007

(54) PERFORMANCE INFORMATION MONITORING SYSTEM, METHOD AND PROGRAM

(75) Inventors: Yusuke Fukuda, Fujisawa (JP);
Tadashi Numanoi, Yokohama (JP);
Tomohiro Kominami, Yokohama (JP);
Naoki Shimada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 302 days.

(21) Appl. No.: 10/634,769

(22) Filed: Aug. 6, 2003

(65) Prior Publication Data

US 2004/0210418 A1 Oct. 21, 2004

(30) Foreign Application Priority Data

Apr. 17, 2003 (JP) ............................. 2003-112290

(51) Int. Cl.
*G06F 11/30* (2006.01)

(52) U.S. Cl. .................... 702/186; 702/182; 714/47

(58) Field of Classification Search ................ 702/182, 702/186, 187, 188; 714/47
See application file for complete search history.

(56) References Cited

U.S. PATENT DOCUMENTS

| | | | |
|---|---|---|---|
| 5,210,829 A | | 5/1993 | Bitner |
| 5,390,299 A | | 2/1995 | Rege et al. |
| 5,581,482 A | * | 12/1996 | Wiedenman et al. ....... 702/186 |
| 5,671,412 A | * | 9/1997 | Christiano ............... 707/104.1 |
| 5,740,468 A | | 4/1998 | Hirose |
| 5,774,377 A | * | 6/1998 | Eidson et al. ................ 702/187 |
| 5,796,633 A | * | 8/1998 | Burgess et al. ............. 702/187 |
| 6,212,582 B1 | | 4/2001 | Chong et al. |
| 6,219,728 B1 | | 4/2001 | Yin |
| 6,275,896 B1 | | 8/2001 | Kojima |
| 6,715,007 B1 | | 3/2004 | Williams et al. |
| 6,851,000 B2 | | 2/2005 | Lai |
| 6,928,394 B2 | * | 8/2005 | Bauchot et al. ............. 702/188 |
| 2002/0059274 A1 | * | 5/2002 | Hartsell et al. ............. 707/100 |
| 2002/0083169 A1 | * | 6/2002 | Aki et al. .................... 709/224 |
| 2002/0103969 A1 | | 8/2002 | Koizumi et al. |
| 2003/0188085 A1 | | 10/2003 | Arakawa et al. |
| 2003/0204789 A1 | * | 10/2003 | Peebles et al. ................ 714/47 |

FOREIGN PATENT DOCUMENTS

| | | |
|---|---|---|
| JP | A-7-282090 | 10/1995 |
| JP | A-2001-273336 | 10/2001 |

* cited by examiner

*Primary Examiner*—Marc S. Hoff
*Assistant Examiner*—Janet L Suglo
(74) *Attorney, Agent, or Firm*—Mattingly, Stanger Malur & Brundidge, P.C.

(57) ABSTRACT

A performance information monitoring method using computers includes the steps of accepting information on a group relating to a first computer in the first computer; storing the accepted group information in a storage in the first computer; accepting performance information from a second computer in the first computer; comparing performance information of the second computer previously stored in a storage with the performance information received from the second computer in the first computer; judging whether or not the second computer is included in the information of the group when finding a difference between the performance information in the comparison result; and transmitting an instruction to the computer included in the group information to change a performance information collection interval according to the judgment result.

12 Claims, 15 Drawing Sheets

| | RESOURCE | CAPACITY | USED CAPACITY | FREE CAPACITY | TIME |
|---|---|---|---|---|---|
| LINE | FILE SYSTEM 1 | 5MB | 4MB | 1MB | 2003/01/13 05:00 |
| | FILE SYSTEM 1 | 5MB | 4MB | 1MB | 2003/01/13 06:00 |
| | FILE SYSTEM 1 | 5MB | 4MB | 1MB | 2003/01/13 07:00 |
| | FILE SYSTEM 1 | 5MB | 3MB | 2MB | 2003/01/13 08:00 |
| | FILE SYSTEM 1 | 5MB | 3MB | 2MB | 2003/01/13 09:00 |
| | FILE SYSTEM 1 | 6MB | 3MB | 3MB | 2003/01/13 10:00 |

EXAMPLE OF DATA STORED IN DATA STORAGE 130  MB: MEGABYTE

FIG. 6

| RESOURCE | CAPACITY | USED CAPACITY | FREE CAPACITY | START TIME | END TIME |
|---|---|---|---|---|---|
| FILE SYSTEM 1 | 5MB | 4MB | 1MB | 2003/01/13 05:00 | 2003/01/13 07:00 |
| FILE SYSTEM 1 | 5MB | 3MB | 2MB | 2003/01/13 08:00 | 2003/01/13 09:00 |
| FILE SYSTEM 1 | 6MB | 3MB | 3MB | 2003/01/13 10:00 | 9999/12/31 23:00 |

610  620  630  640  650  660

EXAMPLE OF DATA STORED IN DATA STORAGE 230   MB: MEGABYTE

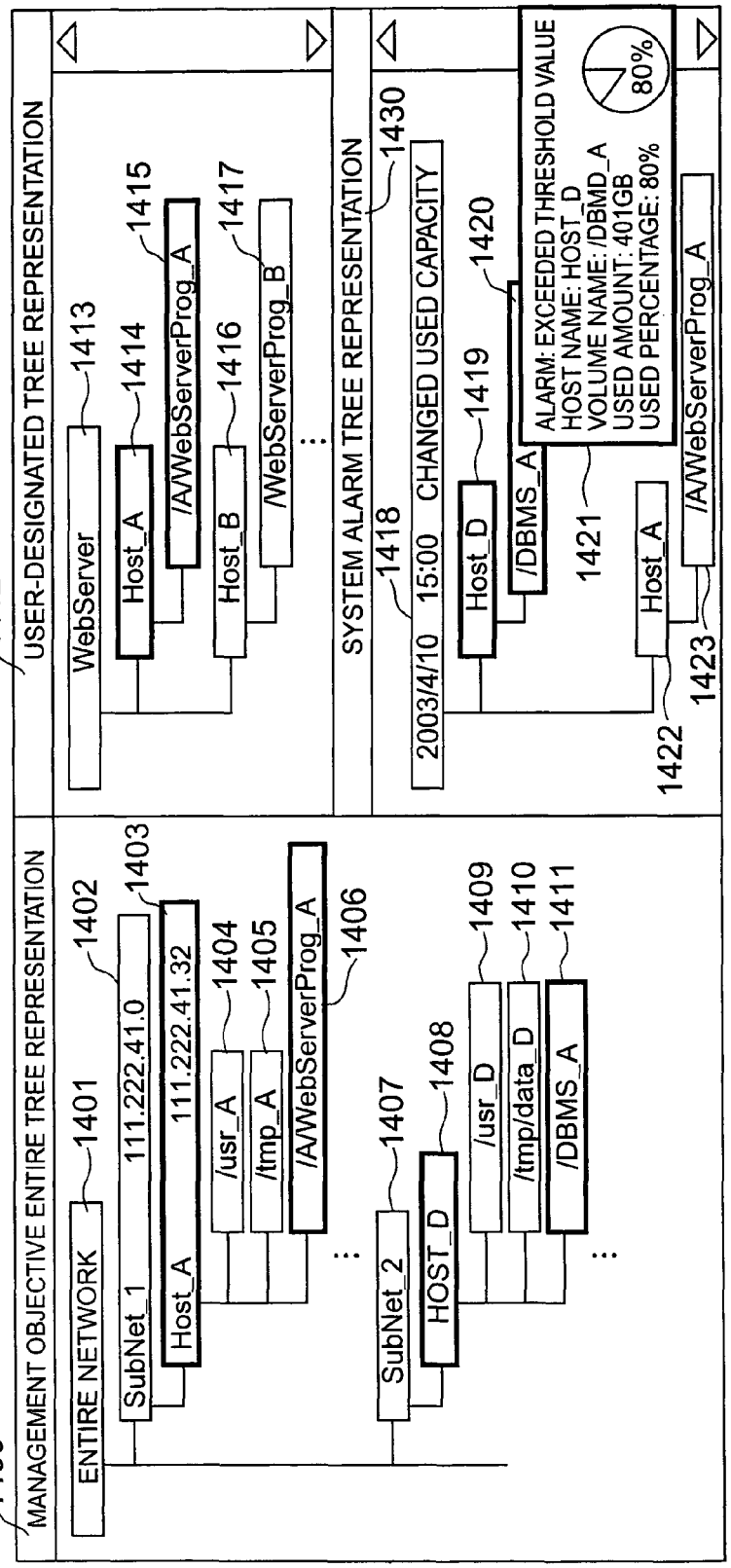

FIG. 15

| SUBNET 1500 | HOST NAME/AGENT NAME 1501 | VOLUME NAME 1502 | THRESHOLD VALUE 1503 FREE CAPACITY | 1504 USED CAPACITY | ALARM MESSAGE 1506 |
|---|---|---|---|---|---|
| SubNet_1 | Host_A | /usr_A | 20% OR LESS | — | FREE CAPACITY BECAME 20% OR LESS |
| | | /AWebServerProg_A | — | 70% OR MORE | USED PERCENTAGE IS 70% OR MORE |
| | | .... | .... | .... | .... |
| SubNet_2 | Host_D | /usr_D | 20% OR LESS | — | FREE CAPACITY BECAME 20% OR LESS |
| | | /tmp/data_D | 15% OR LESS | — | FREE CAPACITY DECREASED TO 15% OR LESS |
| | | /DBMS_A | — | 400GB OR MORE | EXCEEDED THRESHOLD VALUE |
| | .... | .... | .... | .... | .... |
| .... | | | | | |

PERFORMANCE INFORMATION MONITORING SYSTEM, METHOD AND PROGRAM

BACKGROUND OF THE INVENTION

The present invention relates to monitoring and collection of performance information concerning a computer system having resources such as storage devices by using a computer.

One of related arts is to issue an instruction to increase a collection frequency of data to be managed from the next time when an abnormal variation is found in the data to be managed (for example, refer to JP-A-2001-273336, pp. 3–5).

One of methods for collecting data from a controller is to collect data from one of controllers having a high rate of change of important monitoring data at a preferential rate (for example, refer to JP-A-7-282090, pp. 2–4).

In the related arts, no consideration was paid to the influences on other parts caused by a change in data when performance information is provided to a user.

SUMMARY OF THE INVENTION

It is an object of the present invention to issue an instruction about a data collection interval according to the detected result of occurrence of an input or output to/from disk area.

Another object of the performance information is to acquire information according to user's designation.

A further object of the performance information is to provide performance information easily understandable for a user.

In accordance with the performance information, the above objects are attained by providing a method for collecting performance information using computers, wherein a first computer accepts information about a group to which the computer belongs and stores the accepted group information in a storage, and when the first computer receives performance information from a second computer, compares the received performance information with performance information previously stored in the storage, and found a change in the performance information on the basis of the performance information comparison, the first computer judges whether or not the second computer is included in the group information and issues an instruction to the computer included in the group information to change an interval of collecting the performance information.

Other objects and methods for solving the objects as disclosed in the present application will be apparent as the following description of the invention advances as detailed with reference to preferred embodiments of the invention as shown in accompanying drawings.

BRIEF DESCRIPTION OF THE DRAWINGS

FIG. 6 is an example of data stored in a data storage 230;

FIG. 14A is an example of display screen representation;

FIG. 14B is an example of information of user-designated group;

FIG. 15 is an example of information about a system configuration, volume and threshold associated with each other.

DESCRIPTION OF THE EMBODIMENTS

The embodiments according to the present invention will be described in detail.

Figure 1:
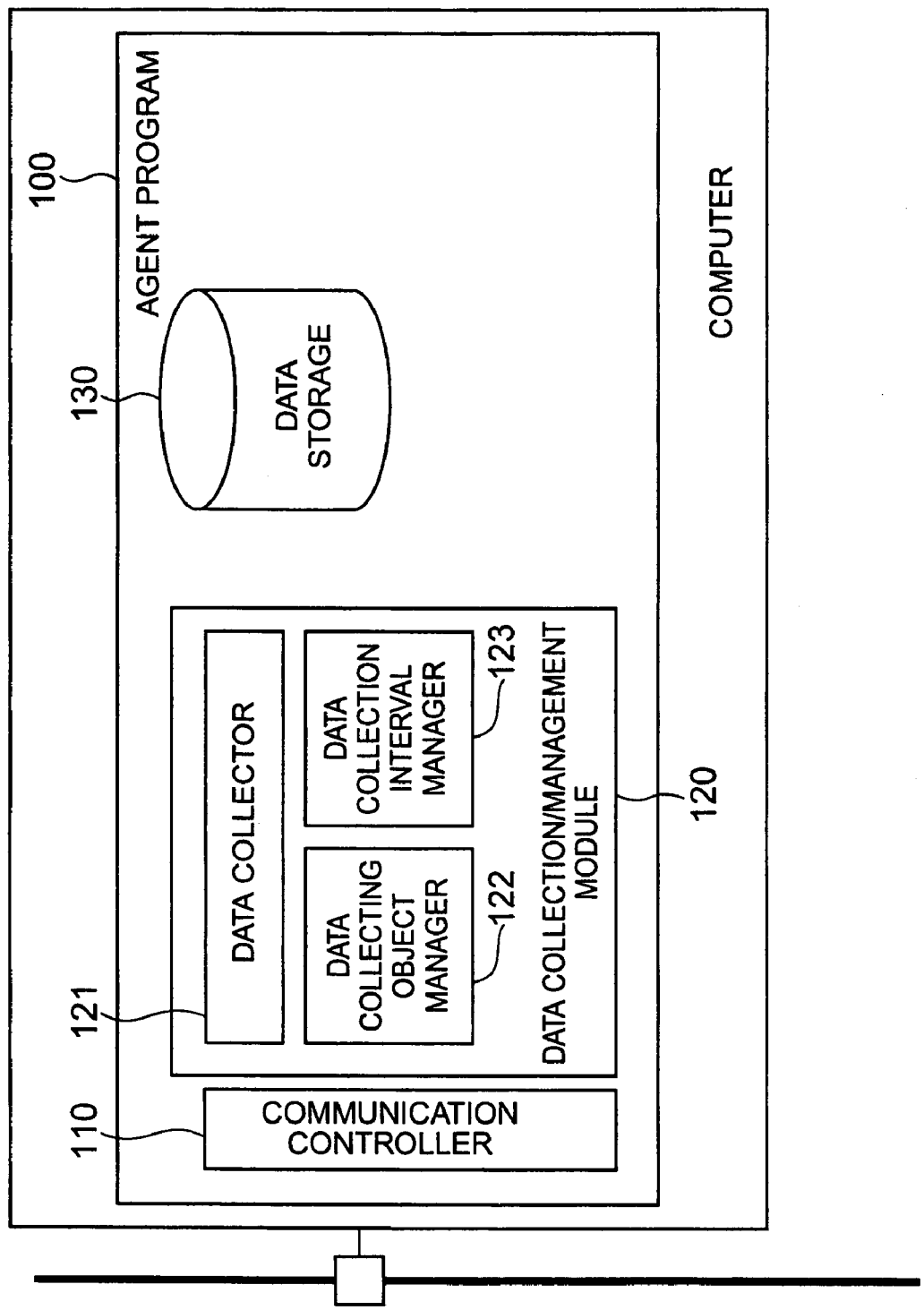
FIG. 1 is an example of an agent program.

FIG. 1 shows an example of an agent program.

An agent program 100 includes a communication controller 110, a data collection/management module 120, and a data storage 130.

The communication controller 110 has a function of transmitting and receiving data when data transmission, wireless communication or the like is carried out in a network such as a local area network (LAN).

The data collection/management module 120 includes a data collector 121, a data collecting object manager 122, and a data collection interval manager 123.

The data collecting object manager 122 manages information of an object from which data is to be collected. Data to be collected include information about disks or various types of storages (such as RAID (redundant arrays of inexpensive disks), DVD (digital versatile disk), MO (magneto optical disk), tape, switch), information about a computer for managing such storages, and information about software or computer which utilizes such storages.

The data collection interval manager 123 has a function of receiving a data collection interval shortening event and shortening a data collection interval, and also has a function of receiving a data collection interval enlarging event and enlarging a data collection interval.

The word "event" as used herein means information to be transmitted and received by a program (or computer). Details of information included in the event will be explained when an event generator included in each program is explained.

The data collector 121 has a function of collecting data on the basis of information held in the data collecting object manager 122 and data collection interval manager 123.

The data collector 121 has a function of storing collected data in the data storage 130 in an order of time series. How capacity type data acquired by the data collector 121 are stored in the data storage 130 will be explained in detail in connection with an exemplary case by referring to FIG. 5.

The data storage 130 has a function of transmitting data stored in the data storage 130.

Figure 2:
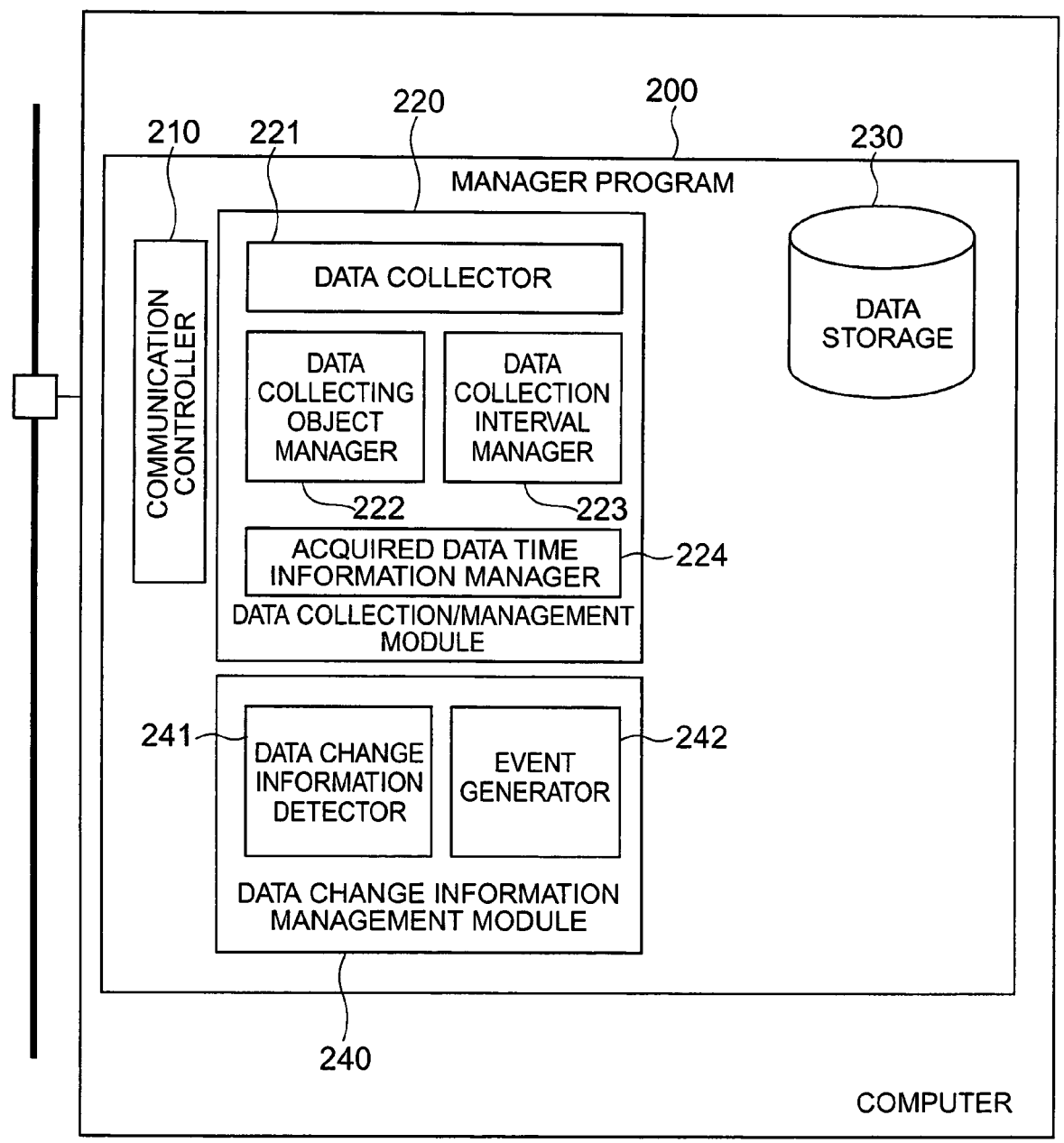
FIG. 2 is an example of a manager program.

FIG. 2 is an example of a structure of a manager program.

A manager program 200 includes a communication controller 210, a data collection/management module 220, a data collector 221, a data collecting object manager 222, a data collection interval manager 223, an acquired data time information manager 224, a data storage 230, a data change information management module 240, a data change detector 241, and an event generator 242.

The communication controller 210 has a function of transmitting data to the agent program 100 according to a request from the data collector 221 and receiving data from the agent program 100 when data transmission, wireless communication or the like is carried out via a network such as a local area network (LAN). The communication controller 210 also has a function of transmitting data to the agent program 100 according to a request from the event generator 242.

The data collection/management module 220 includes the data collector 221, the data collecting object manager 222 and the data collection interval manager 223.

The data collecting object manager 222 has information on the agent program of an object from which data is to be collected. When a plurality of agent programs are present for the manager program 200 on a network via a LAN, it is assumed that the data collecting object manager 222 selects one of the agent programs of the object for data to be collected therefrom.

In this connection, the agent program information may be any of the following information or the other information.
Identifier or title of the agent program.
Host name, MAC address or IP address of a computer to be operated by the agent program.
Information (title, volume name, port number, WWN (world wide name), performance information, etc.) on a storage of a computer operated by the agent program.
Information (DBMS (data base management system), OS, Web server program, application program or the like) on a program using a file stored in a storage of a computer operated by the agent program.
Port number used for a computer operated by the agent program.
IP address of the manager program of the agent program for data transmission and reception.

The data collection interval manager 223 has information about time interval at which the manager collects data from the agent program to be monitored. On the basis of the data collection time-interval information possessed by the data collection interval manager 223, the manager program 200 issues a request to transmit data possessed by the agent program from the agent program 100 to the manager program at regular intervals.

The acquired data time information manager 224, which has time information of data stored in the data storage 230, has a function of updating the acquired time information according to data transmitted from the data storage 130.

The data collector 221 has a function of collecting data on the basis of information possessed by the data collecting object manager 222 and data collection interval manager 223, and also has a function of demanding data not stored yet in the data storage 230 of the data storage 130 on the basis of the information of the acquired data time information manager 224.

The data change information management module 240 has the data change detector 241 and the event generator 242.

The data change detector 241 has a function of comparing data acquired from the data storage 130 with data acquired from the data storage 130.

The data change detector 241 has a function of judging the presence or absence of a change in the capacity information, used capacity information, the value of free capacity information, etc. (which will be referred to as capacity type data or information, hereinafter) of the data acquired from the data storage 130.

In this connection, when the data change detector 241 judges the presence or absence of a change in the acquired information, the detector may determines the presence of a change in the information when finding a difference between N-th acquired information and (N+1)-th acquired information, or may judge the presence or absence of an information change by using another method.

The data collector 221 has a function of storing data corresponding to a change in the data storage 230 when the data change detector 241 detects the change in the capacity type data.

The data collector 221 functions to update the time information of data stored in the data storage 230 when the data change detector 241 detects the absence of a change in the capacity type data. The data collector 221 also functions to discard the data without being stored in the data storage 230 when the data change detector 241 detects the absence of a change in the capacity type data.

The event generator 242 has a function of generating a data collection interval enlarging event for the data collection interval manager 123 of the agent program 100 when the data change detector 241 detects the absence of a change in the capacity type data.

The event generator 242 of the manager program generates an event according to information received from the agent program. The event includes information which follow. These information, however, are given as an example and thus other information for use in the monitoring or collection of performance information may be used as an event.
Data collection interval change flag.
IP address of a computer operated by the program as a destination.
Port number for the program to use in transmission and reception of data.

For example, an event when a flag for shortening a data collection interval is "0", a flag for enlarging the data collection interval is "1", an IP address is "111.222.33.4", and a port number is "8080", includes exemplary information which follows. (In this connection, the contents of the data collection interval change flags may be previously defined in the agent program and manager program.)

|0|111.222.33.4|8080| . . . Example of Data Collection Interval Enlarging Event

How the manager program 200 acquires and processes data held in the agent program 100 will be explained in detail by referring to a flowchart of FIG. 9.

The data storage 230 has a function of transmitting the data of the data storage 230. How the data of the agent program acquired by the data collector 221 is stored in the data storage 230 will be explained in detail in connection with its example with use of FIG. 6.

Figure 3:
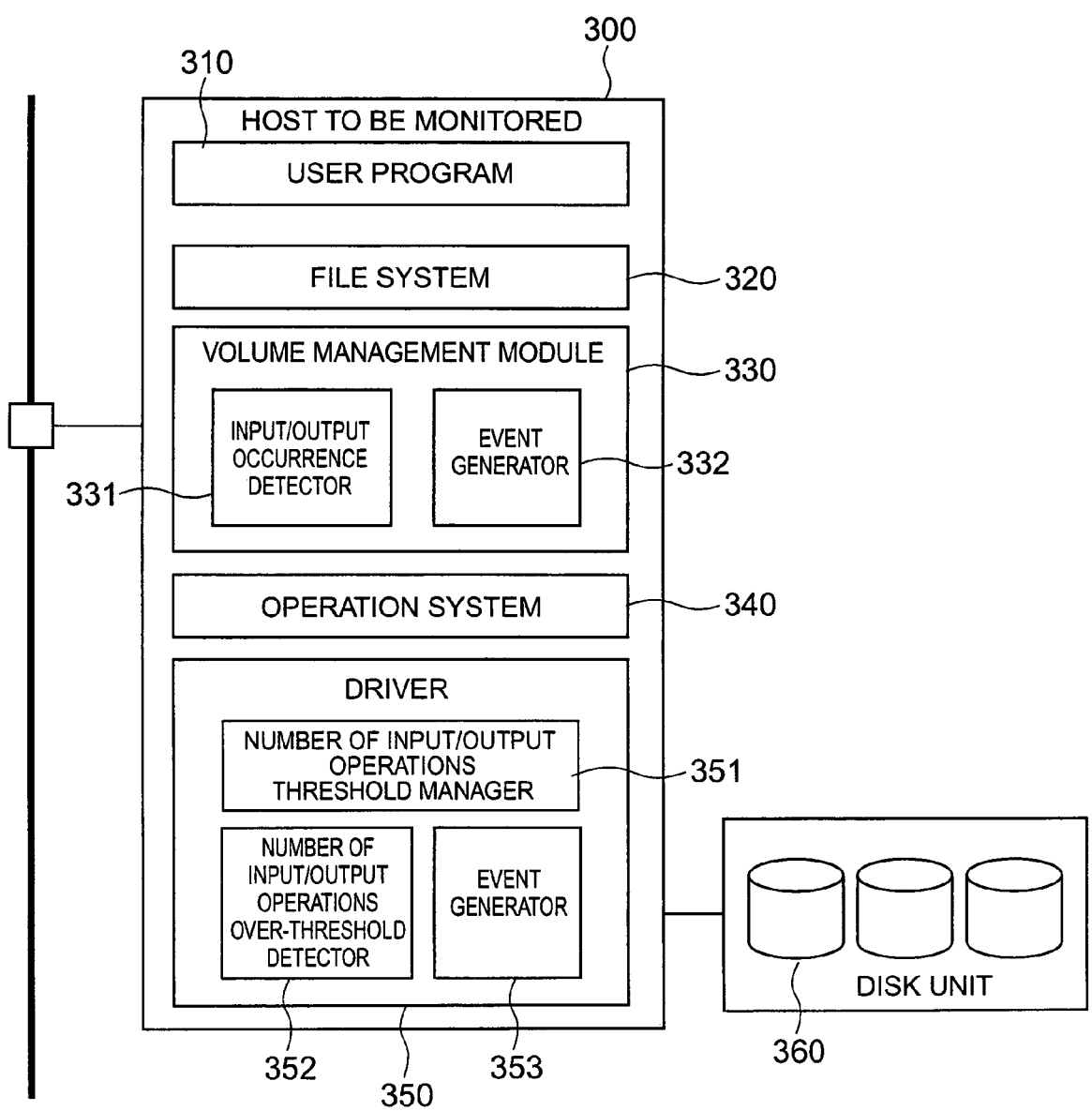
FIG. 3 is an example of a host to be monitored and a program for operating the host.

Shown in FIG. 3 is an example of a structure of a host to be monitored.

A host 300 to be monitored includes a user program 310, a file system 320, a volume management module 330, an input/output generation detector 331, an event generator 332, an operation system 340, a driver 350, a number of input/output operations threshold manager 351, a number of input/output operations over-threshold detector 352, an event generator 353, and a disk unit 360.

The user program 310 has a function of operating a program defined by a user.

The file system 320 has information for managing a disk connected to the host to be monitored (a computer such as a server) or a storage to be used by a server via a network.

The file system is used for a disk or the like connected to the server. Thus the operation system can manage the capacity information, used capacity information, free capacity information., the number of recorded files, file owner, file write authority, file read authority, and file execution authority of the disk included in the file system.

The disk capacity monitoring device can monitor the capacity type information of the disk connected to the server using a function offered by the operation system.

The volume management module 330 has an input/output generation detector 331 and an event generator 332. The word "volume" as used herein refers to one of disks connected to a server and having divided sections of suitable sizes. The volume may also refer to a storage area of various types of storages not connected directly to a server. For example, the volume may refer to an area of a storage usable by a computer via a storage area network (SAN) or may refer to another type of area.

The input/output generation detector 331 has a function of monitoring a disk area having the capacity type information possessed by the file system stored therein and detecting an occurrence of input or output.

When the input/output generation detector 331 detects an occurrence of an input or output to or from the disk area having the capacity type information of the file system stored therein, the event generator 332 has a function of generating a data collection interval shortening event to the data collection interval manager 123 of the agent program 100.

The operation system 340 functions to provide a common function utilized by the user program 310 to manage the entire server.

The driver 350 has a number of input/output operations threshold manager 351, a number of input/output operations over-threshold detector 352, and an event generator 353.

The driver has a function of causing the operation system to operate peripheral devices.

The number of input/output frequency threshold manager 351 has a function of managing threshold values of an input/output frequency and time information of an internal clock within the server as parameters.

The number of input/output operations over-threshold detector 352 has a function of detecting the fact that the input/output operations to/from the disk to be managed by the driver exceeded the threshold value.

When the number of input/output operations over-threshold detector 352 detected the fact that the input/output operations to/from the disk to be managed by the driver exceeded the threshold value, the event generator 353 has a function of generating a data collection interval shortening event to the data collection interval manager 123 of the agent program 100.

The disk unit 360 indicates disks to be monitored by the driver 350.

The disk unit 360 is controlled under control of the operation system 340 using the function of the driver 350.

Figures 4, 5:
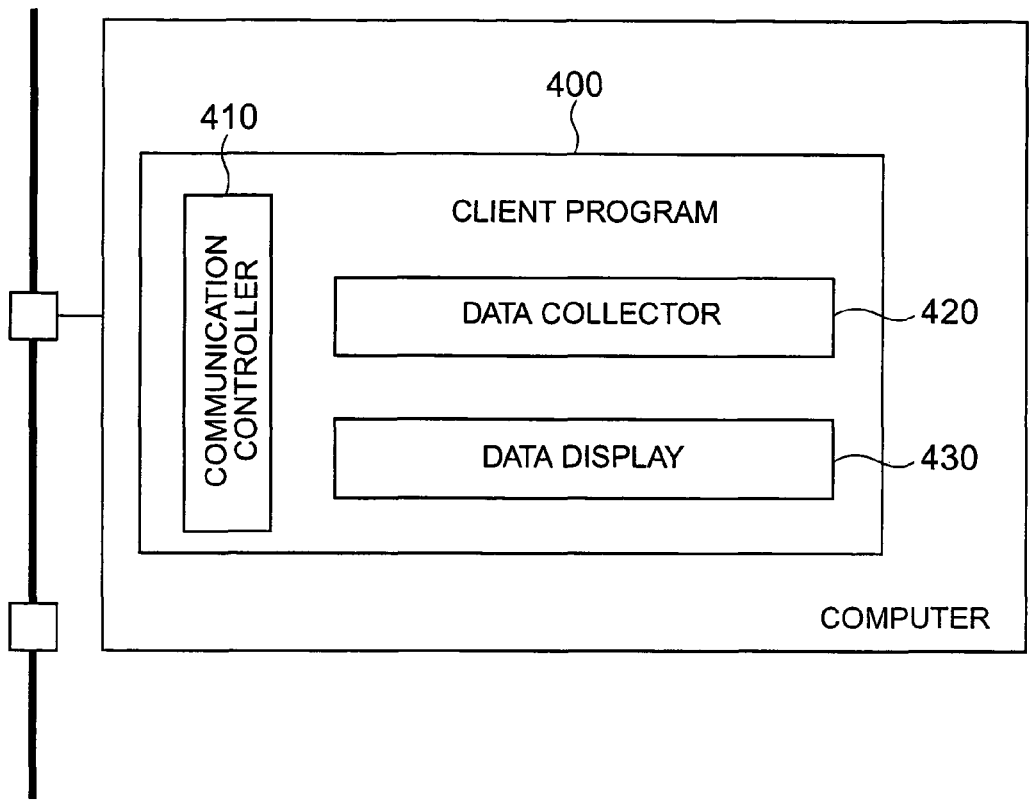
FIG. 4 is an example of a client program.
FIG. 5 is an example of data stored in a data storage 130.

FIG. 4 shows an example of a structure of a client program.

A client program 400 has a communication controller 410, a data collector 420 and a data display 430.

The communication controller 410, which is connected to a local area network (LAN), has a function of transmitting or receiving data.

The data collector 420 has a function of issuing a request to the data storage 230 of the manager program 200 to transmit data to the client program 400.

The data display 430 has a function of displaying data transmitted from the data storage 230 of the manager program 200.

FIG. 5 shows an example of data stored in the data storage 130 of the agent program 100. The data are stored in a resource column 510, a capacity column 520, a used capacity column 530, a free capacity column 540 and a time column 550.

Stored in the resource column 510 are file system names acquired by the agent program 100 using the function of the operation system 340. In this connection, the type name, volume name or identifier of a storage device may be used as the resource name.

Stored in the capacity column 520 are the capacity information of the file systems acquired by the agent program 100 using the function of the operation system 340.

Stored in the used capacity column 530 are used capacity information of the file systems acquired by the agent program 100 using the function of the operation system 340.

Stored in the free capacity column 540 are free capacity information of the file systems acquired by the agent program 100 using the function of the operation system 340.

Stored in the time column 550 are time information of the internal clock possessed by the server, based on which the agent program operates when the agent program 100 acquires the data in the resource column 510, capacity column 520, used capacity column 530 and free capacity column 540 using the function of the operation system 340.

Data collected by the data collector 121 of the agent program 100 are sequentially stored in the data storage 130 together with time information for each of the data. Accordingly, even when no change takes place in the acquired capacity type information, the acquired data are stored in the data storage 130 together with time information. In the example of FIG. 5, there is no change in the capacity type information of from "2003/01/13 05:00 to "2003/01/13 07:00", but the data are sequentially stored in the data storage 130.

FIG. 6 shows an example of data of the data storage 130 stored in the data storage 230 when the data storage 130 is in such a state as shown in FIG. 5.

Data are stored in a resource column 610, a capacity column 620, a used capacity column 630, a free capacity column 640, a start time column 650 and an end time column 660, which columns will be explained below.

Stored in the resource column 610 are information of the resource column 510 acquired by the manager program 200 from the data storage 130 of the agent program 100.

In this case, however, it is featured that, when the acquired resource name of the resource column 510 is the same as the resource name acquired at the previous time and when the data change detector 241 of the manager program 200 detects the fact that there is no change in any of the data of the capacity column 520, used capacity column 530 and free capacity column 540 acquired by the manager program 200 from the data storage 130 of the agent program 100; the data of the resource column 510 is not stored in the resource column 610.

Stored in the capacity column 620 are information of the capacity column 520 acquired by the manager program 200 from the data storage 130 of the agent program 100.

In this case, however, it is featured that, when the resource name of the resource column 510 is the same as the resource name acquired at the previous time and when the data change detector 241 of the manager program 200 detects the fact that there is no change in any of the data in the capacity column 520, used capacity column 530 and free capacity column 540 acquired by the manager program 200 from the data storage 130 of the agent program 100; the data of the capacity column 520 is not stored in the capacity column 620.

Stored in the used capacity column 630 are information of the used capacity column 530 acquired by the manager program 200 from the data storage 130 of the agent program 100.

In this case, however, when the resource name of the resource column 510 is the same as the resource name acquired at the previous time and when the data change detector 241 of the manager program 200 detects the fact that there is no change in any of the data in the capacity column 520, used capacity column 530 and free capacity column 540 acquired by the manager program 200 from the data storage 130 of the agent program 100; the data of the used capacity column 530 is not stored in the used capacity column 630.

Stored in the free capacity column 640 are information of the free capacity column 540-acquired by the manager program 200 from the data storage 130 of the agent program 100.

In this case, however, it is featured that, when the resource name of the resource column 510 is the same as the resource name acquired at the previous time and when the data change detector 241 of the manager program 200 detects the fact that there is no change in any of the data in the capacity column 520, used capacity column 530 and free capacity column 540 acquired by the manager program 200 from the data storage 130 of the agent program 100; the data of the free capacity column 540 is not stored in the free capacity column 640.

Stored in the start time column 650 are information of the time column 550 acquired by the manager program 200 from the data storage 130 of the agent program 100.

In this case, however, it is featured that, when the resource name of the resource column 510 is the same as the resource name acquired at the previous time and when the data change detector 241 of the manager program 200 detects the fact that there is no change in any of the data in the capacity column 520, used capacity column 530 and free capacity column 540 acquired by the manager program 200 from the data storage 130 of the agent program 100; the data of the time column 550 is not stored in the start time column 650.

Stored in the end time column 660 are time information at which data collection ends. In this case, one of the end times is "9999/12/31 23:00" as an example.

In this case, however, it is featured that, when the resource name of the resource column 510 is the same as the resource name acquired at the previous time and when the data change detector 241 of the manager program 200 detects the fact that there is no change in any of the data in the capacity column 520, used capacity column 530 and free capacity column 540 acquired by the manager program 200 from the data storage 130 of the agent program 100; the data of the time column 550 is not stored in the end time column 660.

Explanation will next be made in detail in connection with an example wherein data are stored into the data storage 230 of the manager program from the data storage 130 of the agent program under control of the manager program 200.

Since the data of from "2003/01/13 05:00" to "2003/01/13 07:00" stored in the data storage 130 cause no change in the capacity type information, it is represented by one line in the data storage 230. When the next line is not present in the data storage 230, a value indicative of an end time is stored in the end time column of the data storage 230. The data of the end time column is updated to designated time data when the next line is added.

Since the data of "2003/01/13 08:00" causes a change in the used capacity and free capacity information, a line is added in the data storage 230 to store the data. At this time, the end time column of the previous-line data is updated to "2003/01/13 07:00".

Since the data of "2003/01/13 10:00" causes a change in the capacity and free capacity information, a line is added in the data storage 230 to store the data. At this time, the end time column of the previous-line data is updated to "2003/01/13 09:00". Since the next line is not present, the end time column is "9999/12/31 23:00".

Figure 7:
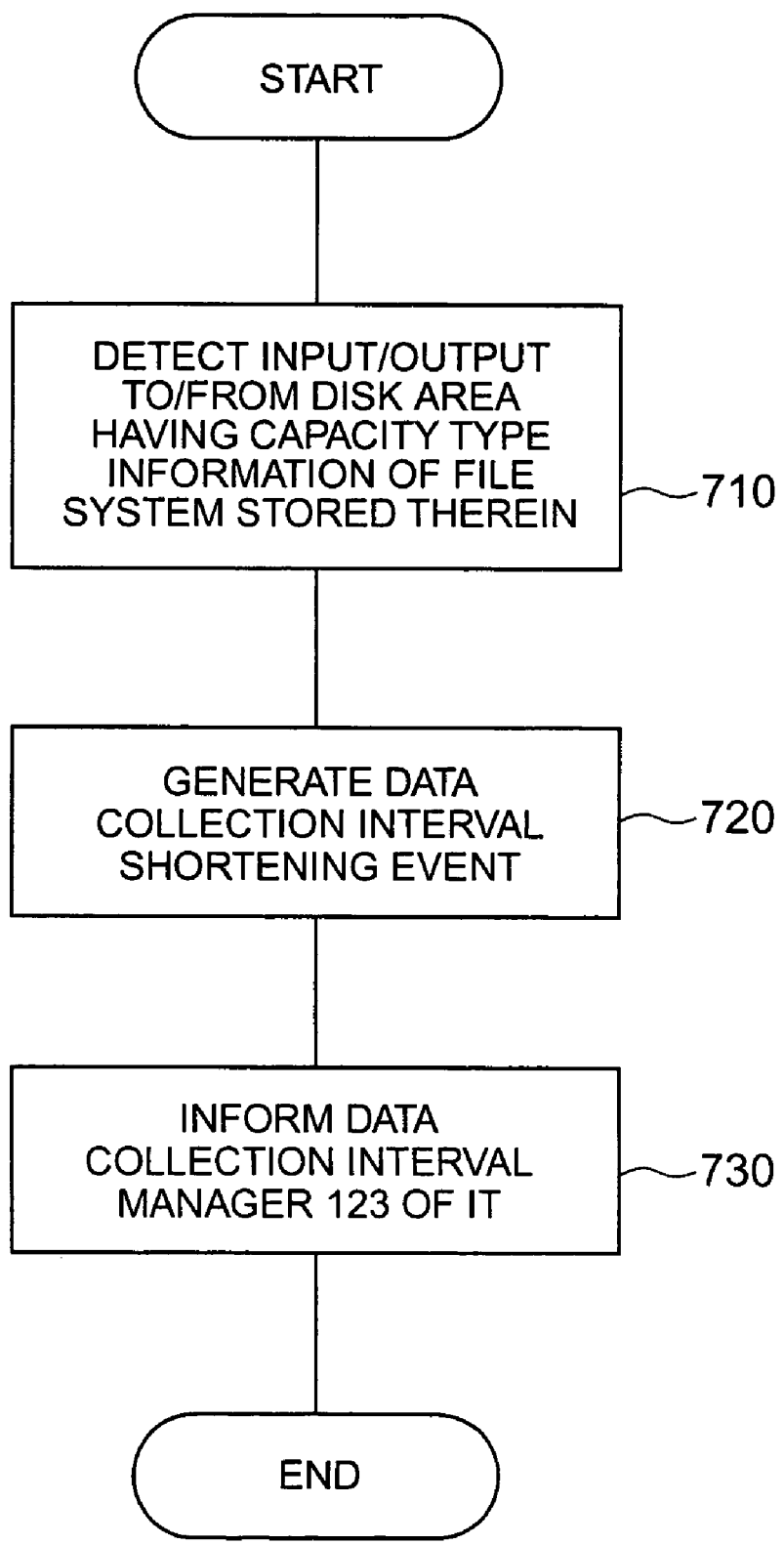
FIG. 7 is an example of operations of a volume management module 330.

FIG. 7 shows a flowchart for explaining a flow of operations of the volume management module 330.

It is assumed in this case that the system can monitor an input or output to or from a disk area having capacity type information of the file system stored therein under control of the volume management module.

The volume management module detects an occurrence of an input or output to or from the disk area having the capacity type information of the file system stored therein (step 710), generates a data collection interval shortening event (step 720), and informs the data collection interval manager 123 of the agent program 100 of the generated event (step 730).

Figure 8:
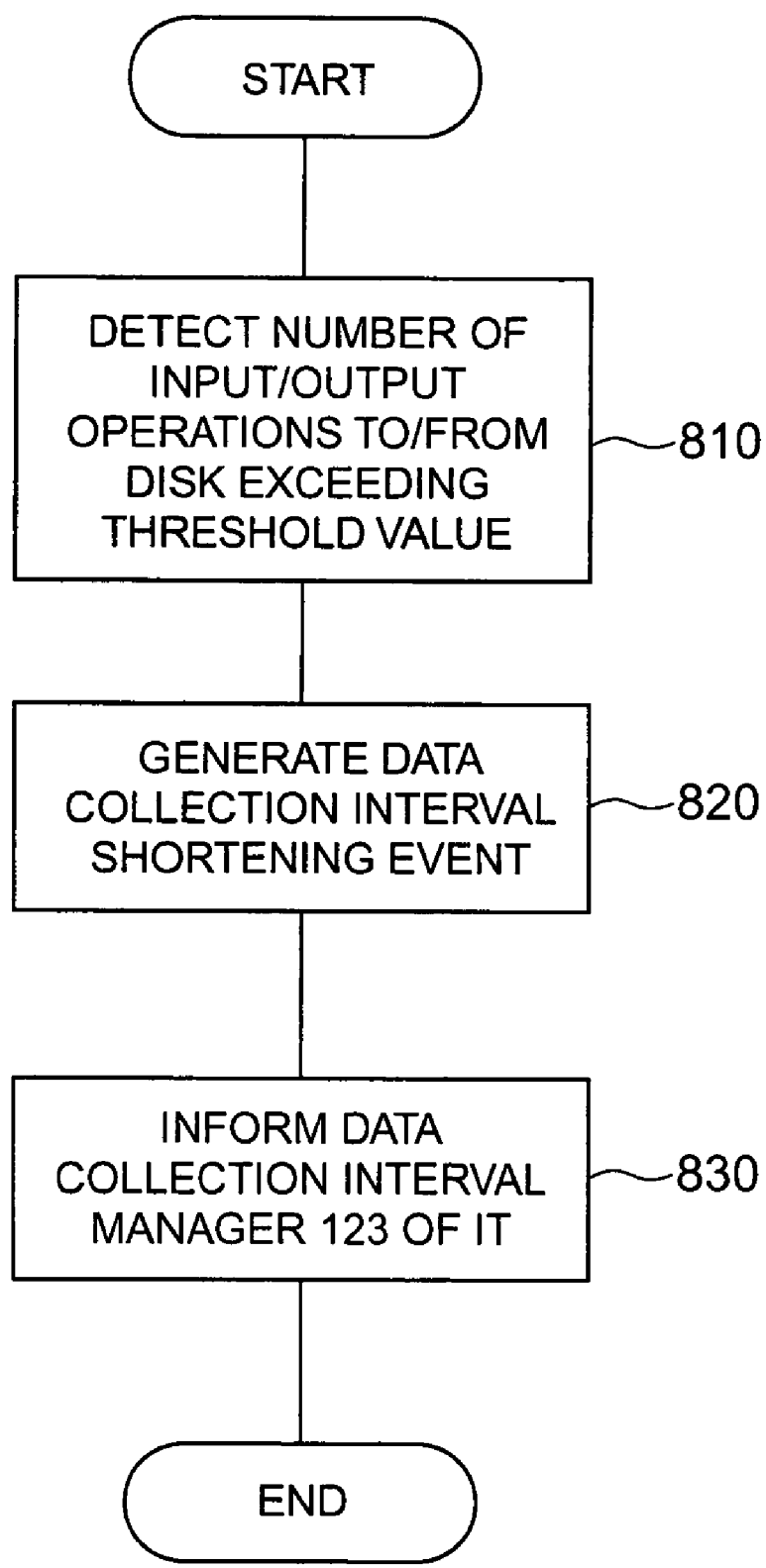
FIG. 8 is an example of operations of a driver 350.

A flowchart of FIG. 8 explains a flow of operations of the driver 350.

It is assumed in this example that, even when an input or output to or from the disk area having the capacity type information of the file system stored therein cannot be monitored by the volume management module, the system of the performance information can monitor an input/output frequency to or from the disk to be managed by the driver.

It is also assumed that a means for monitoring the input/output frequency to/from the disk to be managed by the driver is an alternative to the means for monitoring an input or output to or from the disk area having the capacity type information of the file system stored therein under control of the volume management module.

The driver detects the fact that an input/output frequency to/from a disk to be managed by the driver (step 810), generates a data collection interval shortening event (step 820), and informs the data collection interval manager 123 of the agent program 100 of it (step 830).

Figure 9:
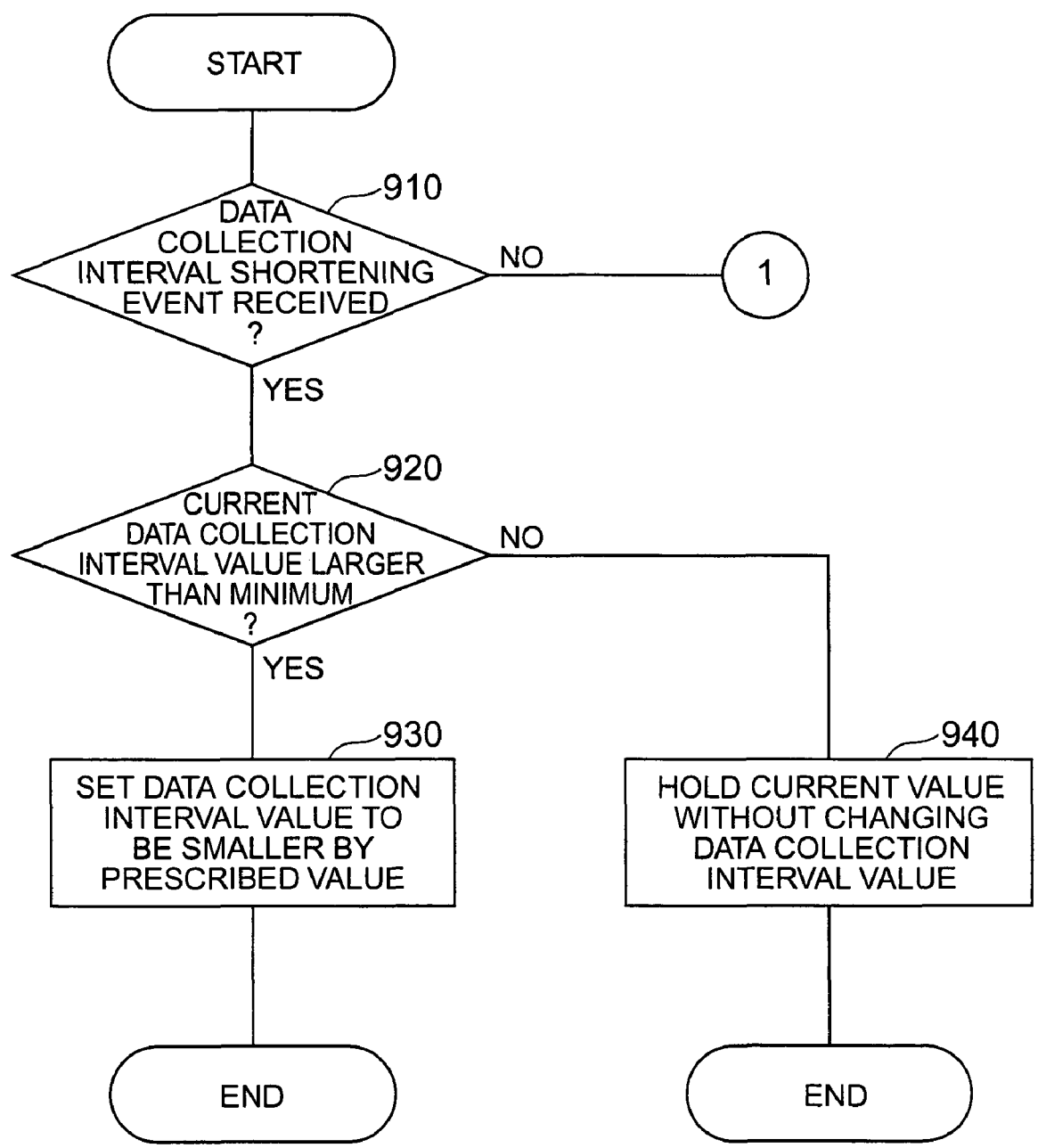
FIG. 9 is an example of operations of a data collection interval manager 123.
Figure 10:
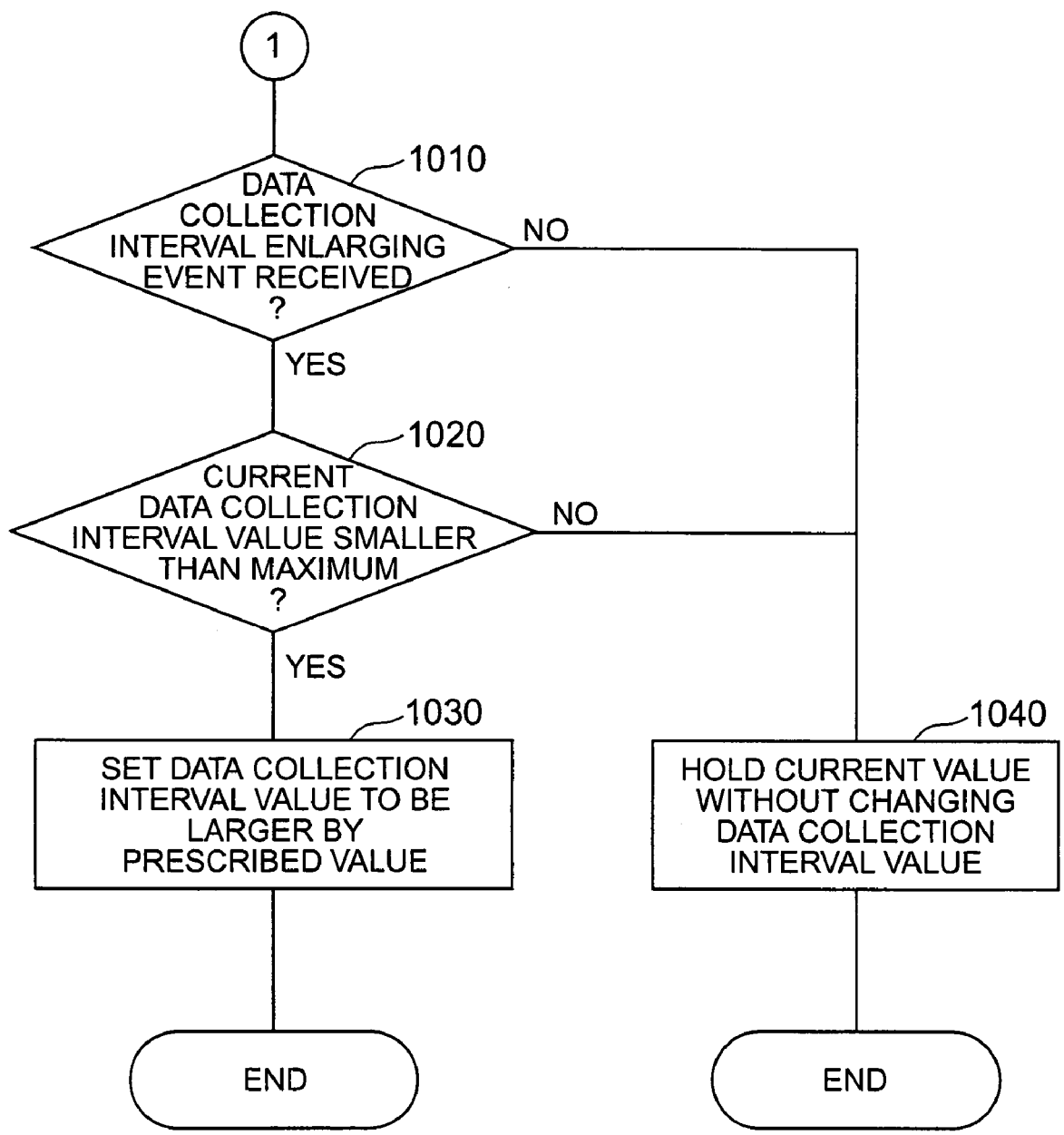
FIG. 10 is another example of operations of the data collection interval manager 123.

FIGS. 9 and 10 show flows of operations of the data collection interval manager 123 of the agent program 100.

It is assumed that the data collection interval manager 123 of the agent program 100 has information about a minimum and maximum of the data collection interval of the agent program 100.

The data collection interval manager receives a data collection interval shortening event from the event generator 332 of the volume management module 330 or from the event generator 353 of the driver 350 (step 910), and decreases the data collection interval value by a predetermined amount when a current data collection interval is larger than the minimum value (step 920) (step 930).

In this connection, a predetermined value for narrowing the data collection interval as well as a predetermined value for widening the data collection interval may be previously determined by a system administrator and be stored in the storage. The same holds true even for the minimum and maximum of the data collection interval.

The data collection interval manager receives a data collection interval shortening event from the event generator 332 of the volume management module 330 or from the event generator 353 of the driver 350 (step 910), and not changes the data collection interval but holds the current set value when the current data collection interval is not larger than the minimum value (step 920) (step 940).

The data collection interval manager fails to receive a data collection interval shortening event from the event generator 332 of the volume management module 330 or from the event generator 353 of the driver 350 (step 910), receives a data collection interval enlarging event (step 1010), and sets the data collection interval value to be larger by a predetermined value (step 1030) when the current data collection interval value is smaller than the maximum value (step 1020).

The data collection interval manager fails to receive a data collection interval shortening event from the event generator 332 of the volume management module 330 or from the event generator 353 of the driver 350 (step 910), receives a data collection interval enlarging event (step 1010), and not changes the data collection interval value but holds the current value (step 1040) when the current data collection interval value is not smaller than the maximum value (step 1020).

When failing to receive a data collection interval shortening event from the event generator 332 of the volume management module 330 or from the event generator 353 of the driver 350 (step 910) and also failing to receive a data collection interval enlarging event (step 1010); the data collection interval manager not changes the data collection interval value but holds the current value (step 1040).

Figure 11:
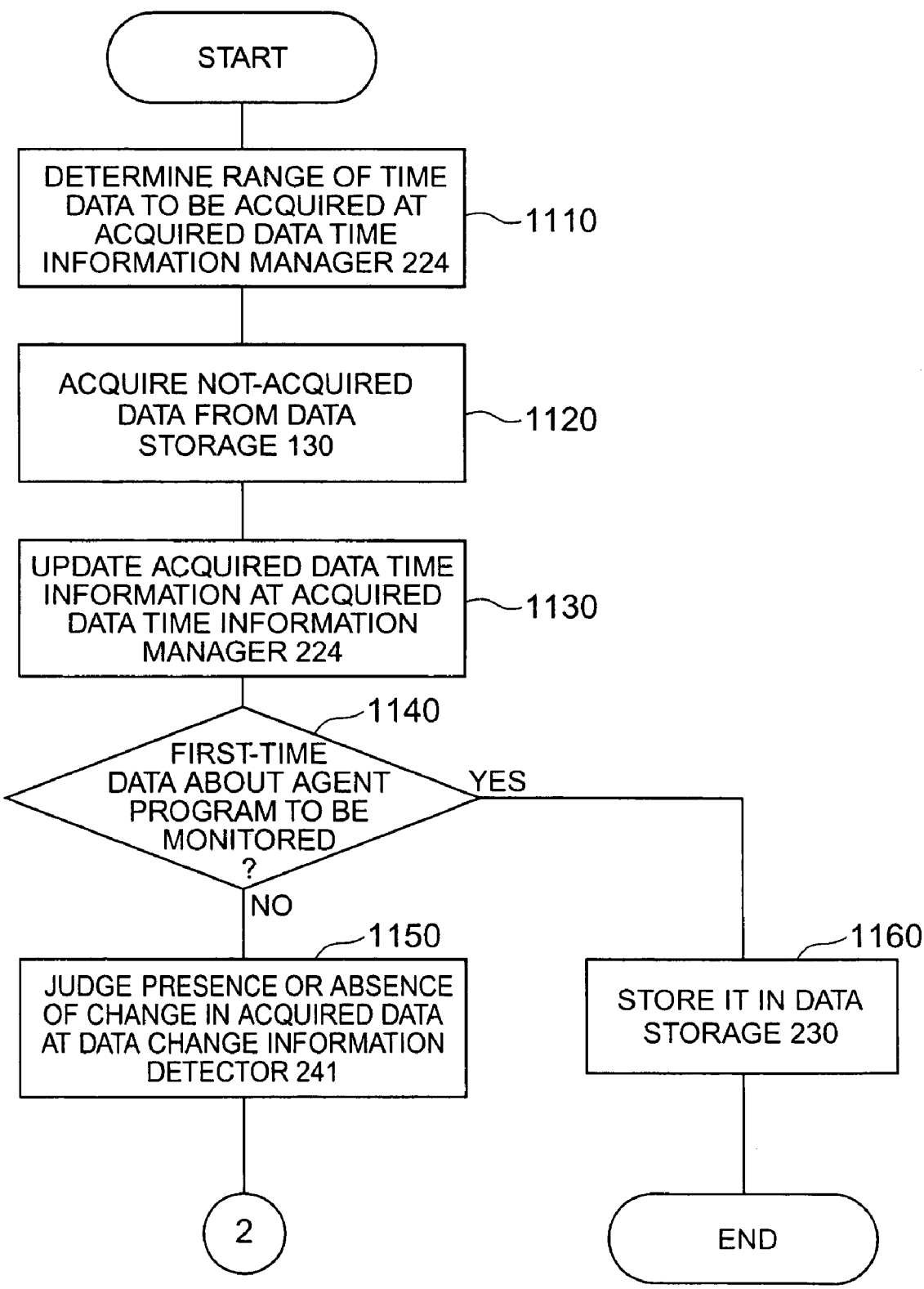
FIG. 11 is an example of operations of the manager program.
Figure 12:
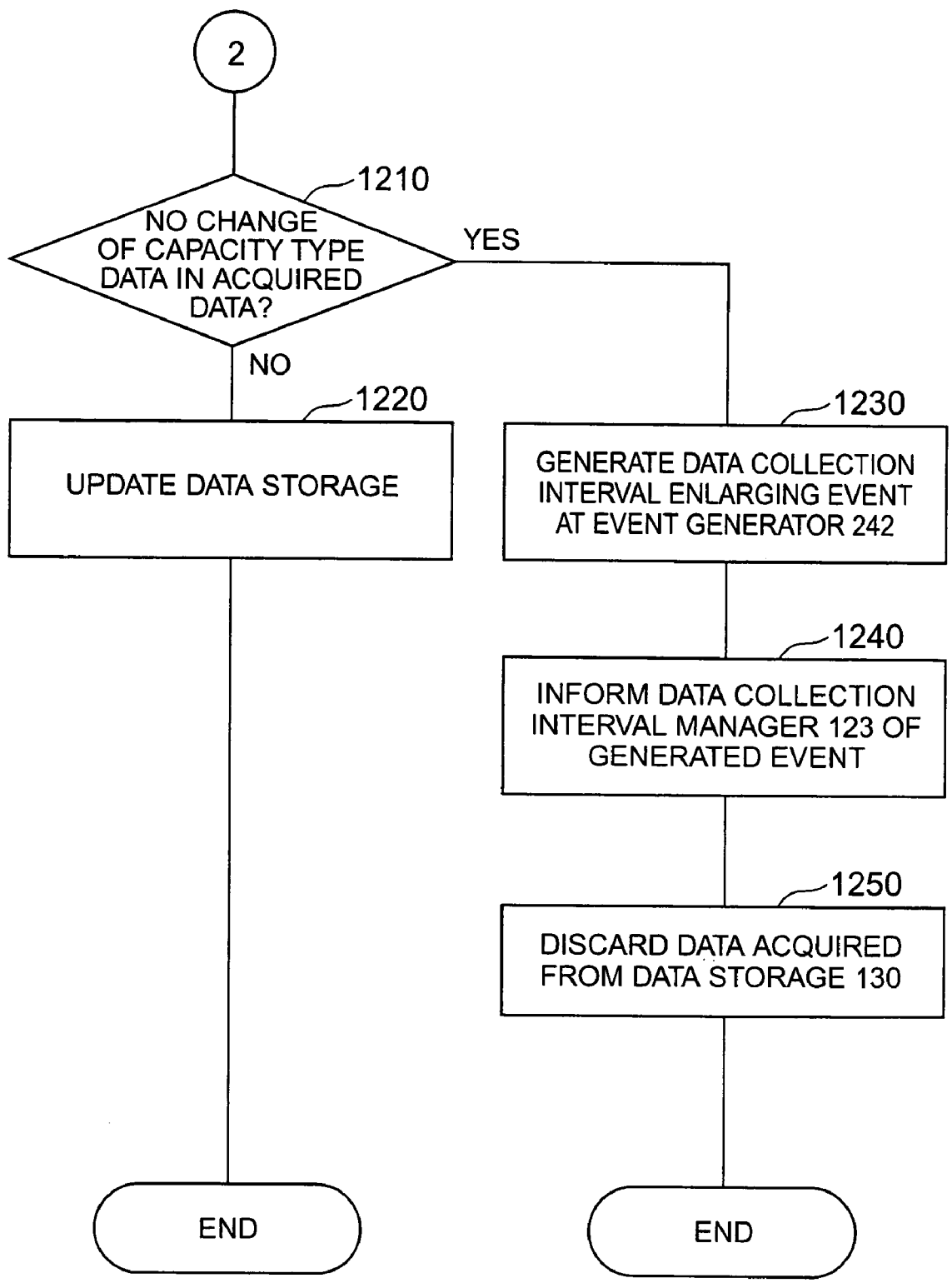
FIG. 12 is another example of operations of the manager program.

FIGS. 11 and 12 show flows of operations of the manager program 200.

The manager program determines a range of time data to be acquired by the acquired data time information manager 224 (step 1110), acquires not-acquired data from the data storage 130 (step 1120), updates acquired data time information at the acquired data time information manager 224 (step 1130), and stores the acquired data in the data storage 230 when the data corresponds to the first-time data for an agent to be monitored (step 1140) (step 1160).

The acquired data time information manager 224 determines a range of time data to be acquired (step 1110).

The manager program acquires not-acquired data from the data storage 130 (step 1120), and updates the acquired data time information at the acquired data time information manager 224 (step 1130). When the acquired data is not the first-time data for the agent to be monitored (step 1140) and when the data change detector 241 judges the presence or absence of a change in the acquired data (step 1150) and determines the presence of a change in the capacity type data of the acquired data (step 1210), the manager program stores the acquired data in the data storage 230 and updates the data storage 230 (step 1220).

The manager program determines a range of time data to be acquired at the acquired data time information manager 224 (step 1110), acquires not-acquired data from the data storage 130 (step 1120), and updates the acquired data time information at the acquired data time information manager 224 (step 1130). When the acquired data is not the first-time data for the agent to be monitored (step 1140) and when the data change detector 241 judges the presence or absence of a change in the acquired data (step 1150) and determines the absence of a change in the capacity type data of the acquired data (step 1210); the event generator 242 generates a data collection interval enlarging event (step 1230), informs the data collection interval manager 123 of the generated event via the communication controller 210 (step 1240), and not stores the data acquired from the data storage 130 in the data storage 230 but discards it (step 1250).

In this way, by immediately detecting a change in the capacity information of the server and shortening the data collection interval of the agent program, the system can accurately collect data at the time of occurrence of a change in the capacity information.

Further, by providing upper and lower limits for the data collection interval and determining a prescribed value for the data collection interval, the system can control a load caused by data collection and can arrange granularity of data to be collected to be uniform. Since the granularity of data is arranged to be uniform, the system can display a plurality of pieces of collected data in such a manner that the user can easily see them. In addition, since the data collection interval has its upper limit, information collection can be done at intervals of a constant time. Thus the system administrator also can confirm whether or not a computer as a destination of the data collection is operated.

Another embodiment will be explained by referring to FIGS. 13 to 16.

Figure 13:
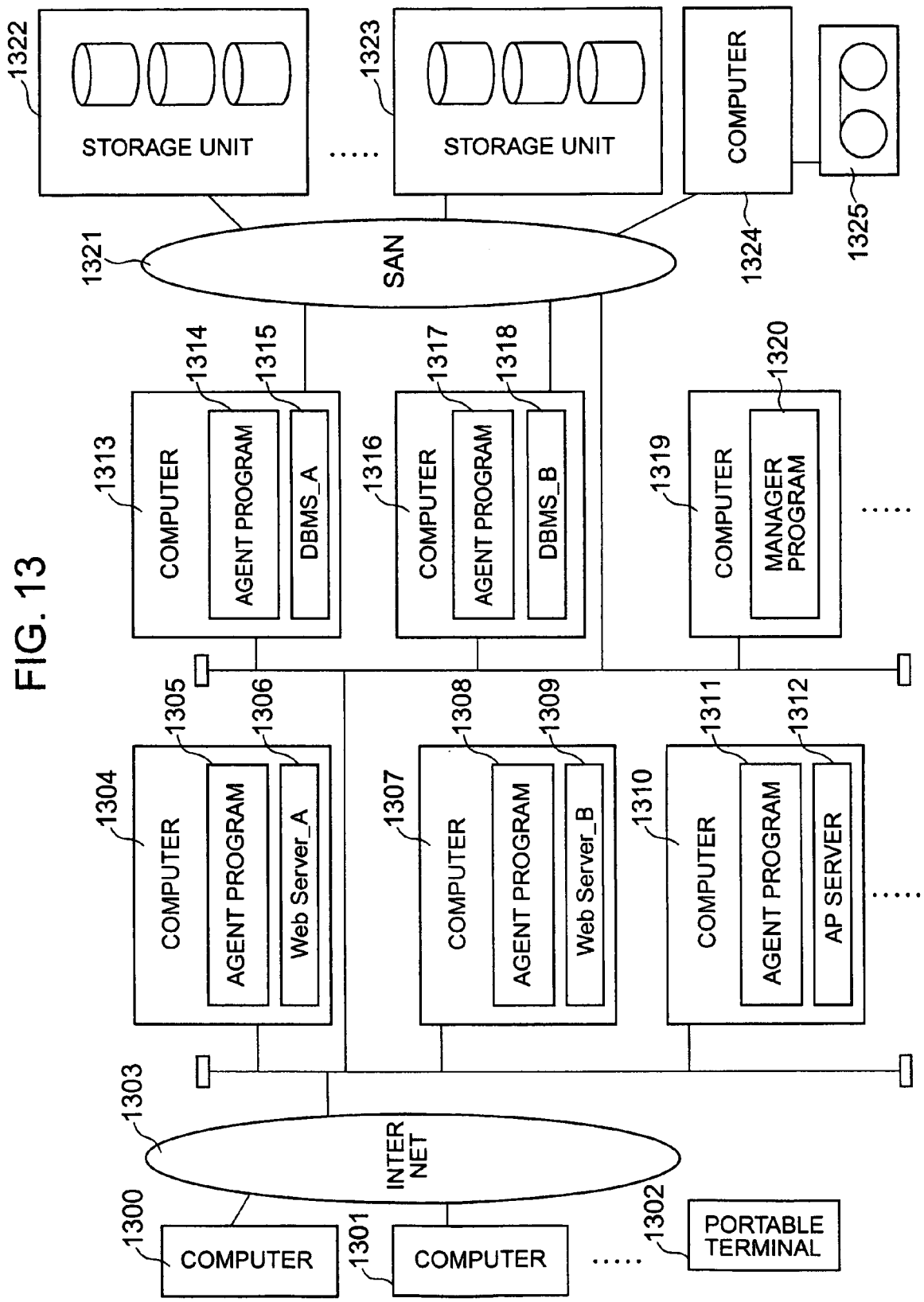
FIG. 13 is an exemplary configuration of an entire system.

FIG. 13 shows an example of an entire system.

A computer 1300 and a computer 1301 are connected to the Internet 1303. The aforementioned computer or portable terminal 1302 performs data transmitting and receiving operations to and from a Web server.

In a computer 1304, an agent program 1305 and a Web server A 1306 as a server program are operated.

In a computer 1307, an agent program 1308 and a Web server B 1309 as a server program are operated.

In a computer 1310, an agent program 1311 and an AP server 1312 as an application server program are operated.

In a computer 1313, an agent program 1314 and a DBMS_A 1315 as a DBMS are operated.

In a computer 1316, an agent program 1317 and a DBMS_B 1318 are operated.

In a computer 1319, a manager program 1320 is operated.

Each of the computers issues an instruction as necessary to perform data writing and reading operations over storage units 1322 and 1323 such as display arrays connected to a storage area network 1321 (SAN) or over a tape unit 1325 connected to a computer 1324.

When a user utilizes a Web service using the computer 1300, a request data from the user is transmitted from the server A 1306 receiving the user's request to the AP server 1312, and further from the AP server to the DBMIS A 1315. The DBMIS A 1315 in turn issues an access request to the storage unit 1322 or the like via the SAN.

In this connection, though not illustrated, an apparatus such as each computer has an OS function of performing necessary operations. Further, a computer for the manager program to monitor may have such a program function as a driver or volume management module as necessary.

FIG. 14A is an example of display screen representation.

A configuration of an entire system is displayed in the form of a tree structure in a window of a management objective entire tree representation 1400. The manager program collects necessary information (such as IP address, net mask, host name, etc. for each computer) by polling the agent program at regular intervals, and displays information about the system configuration on the basis of the collected information.

In this example, an entire network 1401 is represented as a root, and subnets 1402 and 1407 and computers 1403 and 1408 are represented as directories thereof. When the computer 1403 has a host name of "Host_A" and an IP address of "111.222.41.32", further, the computer may also be represented by "Host_A 111.222.41.32" as illustrated. When a net mask is "255.255.255.0" and a server IP address is "111.222.41.32", a subnet may be represented by "111.222.41.0".

Reference numerals 1403, 1404, 1405 and 1406 denotes a computer and volume names (or drive names) managed by the computer which are shown in the form of a tree structure as associated with each other. The same similarly holds true even for reference numerals 1408, 1409, 1410 and 1411.

Volume names designated by the user are represented in a tree form in the window of a user-designated tree representation 1412. The representation is displayed based on information about a user-designated group, which will be explained with reference to FIG. 14B. For example, user designated group 1413 is associated with host name 1416 and volume name 1417.

In the window of a system alarm tree representation 1430, when the value of a disk performance such as a used capacity or free capacity for the disk exceeds a threshold value, the volume name of the associated disk and the name of the computer for managing the volume are displayed as associated with each other.

To a root 1418, date information when the performance information of the disk volume exceeds the threshold value, an item name of the performance information exceeding the threshold value, etc. may be given as its name. Further, the name or identifier of the disk volume having the value exceeding the threshold value and a computer for managing the disk volume are represented as associated with each other. Detailed contents when the disk volume exceeded the threshold value are exemplified by reference numerals 1419, 1420 and 1421. In this case, the case when disk used capacity exceeded the threshold value is illustrated as an example. The contents of threshold value and alarm message will be explained with reference to FIG. 15.

In the window of the system alarm tree representation 1430, not only a volume exceeding a threshold value but also a volume name, host name, etc. associated with the exceeded-threshold volume are represented, examples of which are denoted by reference numerals 1422 and 1423.

For example, such a case that a DBMS is using a volume having a volume name "/DBMS_A" managed by a computer having a host name "Host_D" and the volume name exceeds its threshold value (when the volume use state information satisfies predetermined conditions), is assumed.

In this case, assume that an event for shortening a data collection interval is transmitted to the manager program at the same time as the volume having the volume name "/DBMS_A" exceeds the threshold value of use amount and an event for shortening a data collection interval for a volume having a volume name "/A/WebServerProg_A" is transmitted from the agent program operated by the computer having the host name "Host_A" to the manager program. Then the system judges that the both are associated with each other and displays the both in the window of the system alarm tree representation.

In the window of the system alarm tree representation, the tree representation may be carried out only for a constant time from the time point when the volume exceeded the threshold value, after which the tree representation may be erased while leaving an alarm message, or the display representation may be erased and data information may be saved in a log file.

In the example of FIG. 14A, the volume 1402 having the value exceeding the threshold as well as items 1419, 1422, 1423, 1403, 1406, 1408, 1411, 1414 and 1415 associated with the volume are displayed as highlighted in the respective windows.

In this way, since not only the volume exceeding the threshold value but items associated therewith are also displayed as highlighted, volume management can be realized, taking the entire system configuration into consideration. Further, items designated by the user are displayed, the items can also be monitored for each of volumes designated by the user (system administrator). Even with regard to an item not designated by the user as a monitoring object, if it is necessary to issue an alarm to the administrator for the item, then it can be displayed to be easy to understand it on the system alarm tree representation screen.

FIG. 14B is an example of information of a user-designated group.

The user-designated group information include a user-designated group name 1450, host name or agent name 1451, volume name 1452 and performance information display designation 1453 associated with each other.

For this information, an item designation menu may be provided in the window of FIG. 14A and information accepted by user input may be stored in the menu, or information entered on a command line may be stored therein.

When a single agent program is operated in each computer, information belonging to a group may be managed by a host name. Further, when a plurality of agent programs are operated in a single computer or when managed volumes are different for different agents operated by the same computer, the information management may be carried out by the identifiers or names given to the agent programs.

In this connection, information may be designated or designated by the user who enters or inputs an object name (resource name) such as an agent name to be grouped and the name of the group on a command line. For example, such an input can be employed.

Command for Execution of Group [resource name] [group name]

Further, the group designation may be carried out by the user who designates the agent, server or volume represented in a tree form with use of a mouse pointer or the like on the basis of information (such as an agent name or host name transferred between the agent program and manager program) managed by the manager program.

The group information stored in the storage is used in such a manner that, when an event or performance information was transmitted from another computer (or agent program) to the manager program, the manager program judges whether or not a computer (or agent program) which transmitted the event or performance information belongs to the group information, and on the basis of its judgment result, it transmits necessary information to a computer belonging to the same group.

For example, when the system administrator wants to monitor performance information relating to a plurality of Web server programs, the administrator designates the plurality of Web server programs as a group. When a number of input/output operations to/from a storage used by one of the Web server programs belonging to the group is increased, the administrator can issue such an instruction as to change the collection interval of performance information for the volume used by the Web server program belonging to this group. When the volume exceeds its threshold value, the performance information of the volume belonging to the group can be displayed as associated therewith on the screen.

The designation of the displayed performance information is an example of designation of performance information items to be provided for the user. In the illustrated example, a free capacity 1454, used capacity 1455, device detail 1456, and I/O 1457 with respect to the disk volume are enumerated as an example, but other items may be used.

In this example, since item representation or non-representation is designated for each volume, information can be displayed in detail for each volume. A method for displaying these items may be, when the volume exceeds the threshold value, to display it using a popup window, or another method may be employed.

FIG. 15 is an example of information relating to system configuration, volume name and threshold value associated with each other.

The system configuration information includes a subnet 1500 and a host name 1501. In this connection, the host name may be replaced by the name of the agent program or the identifier of the agent program. This information is exemplary information to be managed by the manager program on the basis of information received from the agent program, but information except for this information may be managed. Further, the manager program collects and manages information from the agent program at regular intenials. Thus, even when the system configuration is changed, information managed by the manager program may be designed to be updated.

In this example, a threshold value 1503 is set for each volume associated with the volume name 1502 as an example. As the threshold value, the system administrator may previously set a predetermined value for a free capacity 1504 or used capacity 1505 of each volume according to the volume. Further, an alarm message 1506 is set for each volume by the system administrator.

Figure 16:
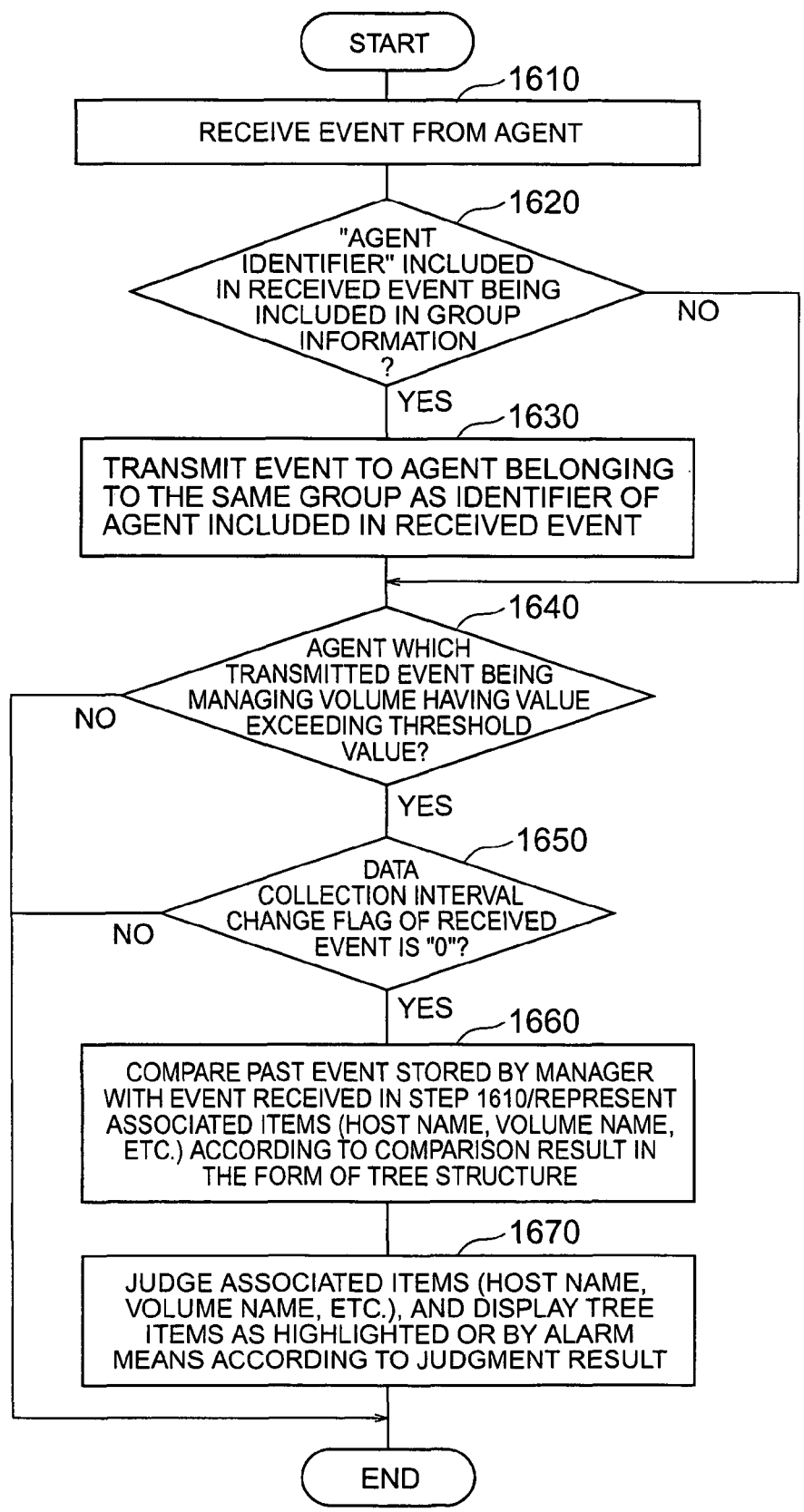
FIG. 16 is an example of operations of the manager program.

FIG. 16 is an example of operations of the manager program.

The manager program receives an event from the agent (step 1610).

The manager program judges whether or not the identifier (such as a host name) of a computer included in the received event and operated by the agent is included in the group information (see FIG. 14B) (step 1620).

When determining that the computer identifier is included in the group information, the manager program transmits the event to a host operated by an agent belonging to the same group as the identifier of the computer operated by the agent included in the received event (step 1630).

The manager program judges whether or not the agent which transmitted the event in the step 1610 manages a volume exceeding a threshold value (step 1640). The judgment may be carried out by acquiring information about storage from the host to which the agent transmitted it, or another judgment method may be employed.

When determining in the step 1640 that the agent manages the volume exceeding the threshold value, the manager program judges a data collection interval change flag included in the event (step 1650). If the judgment result is "0", then the manager program searches for and displays associated items on the basis of the event acquired from the agent program or information obtained by polling the agent program at regular intervals (step 1660). In this connection, this operation is an example when the flag for shortening a data collection interval included in the event is "0", and thus other operation may be employed.

The manager program judges whether or not window-associated items are displayed and, according to the judgment result, the manager program displays information of tree-represented items in a highlighted manner or displays an alarm message (step 1670). At this time, if information of use state of the volume corresponding to the volume name represented in the window satisfies predetermined conditions, then the manager program display the volume name in a highlighted manner. Further, not only the volume name but items associated therewith are also displayed as highlighted.

When the volume satisfying the predetermined conditions and volumes associated therewith are judged and representation of the associated volumes is changed in the step 1670, its judgment may be made by the manager program using a previously-stored event or the received event.

For example, if events past accumulated have data having a predetermined tendency with time, the manager program can display these events and the volume under management of a computer operated by the agent program which transmitted these events as associated therewith. As an example, when performance information transmitted from the agent program which manages a volume name "/DBMS_A" to the manager program as well as performance information transmitted from the agent program which manages a volume name "/A/WebServerProg_A" to the manager program changes in the used capacity at an identical time point (for example, 2003/01/14 10:00), volumes corresponding to the two volume names ("/DBMS_A" and "/A/WebServer-Prog_A") can be judged as associated items.

Further, when the manager program acquires past data stored on a time series basis from the respective agent programs and when some of the time-series past data have the same data change tendency (e.g., when the capacity of a volume changes one hour later from a time at which the capacity of another volume changes at intervals of one day), the manager program can judge these data as associated items. Of course, it goes without saying that another method can be employed to judge and display a volume exceeding a threshold value and a device associated with the volume.

With regard to the display of these information, information offered by the manager program may also be displayed using a browser or the like operated by a portable terminal or computer or by other means.

In this way, when data about a volume to be monitored is changed, the performance information collecting function can be used to judge the data and items associated therewith. As a result, there is provided an interface which can display performance information taking the influences on associated systems or storages into consideration.

Further, since changed information is judged and displayed on the screen, the system administrator (user) can easily grasp a change in the use state or performance information.

When the present invention is used in this way, performance information for the user to be able to easily understand can be offered.

It should be further understood by those skilled in the art that although the foregoing description has been made on embodiments of the invention, the invention is not limited thereto and various changes and modifications may be made without departing from the spirit of the invention and the scope of the appended claims.

What is claimed is:
1. An information processing system comprising:
   a storage apparatus having a plurality of storage areas;
   a first computer; and
   a second computer,
   wherein the first computer comprises:
      an application unit;
      a file system;

a volume management unit; and an operating system unit, wherein the file system manages capacity information of said plurality of storage areas and changes said capacity information based on a read/write request from said application unit, wherein said volume management unit monitors the capacity information to detect a change in the capacity information in said file system and sends a request for decreasing a data collection interval for collecting the capacity information when said change in the capacity information is detected, and wherein said second computer collects the capacity information from said first computer at the data collection interval which is decreased based on said request received from said first computer.

2. The information processing system according to claim 1, further comprising:

a third computer; and a data management unit, wherein the third computer comprises a storage area for storing capacity information and data management unit, and wherein said second computer sends said collected capacity information to said third computer.

3. The information processing system according to claim 2, wherein said data management unit of said third computer stores a current capacity information sent from said second computer into said storage area if said current capacity information sent from said second computer differs from the capacity information previously sent from said second computer.

4. The information processing system according to claim 3, wherein said data management unit of said third computer does not store said capacity information sent from said second computer into said storage area if said current capacity information sent from said second computer is same as the capacity information previously sent from said second computer.

5. The information processing system according to claim 2, wherein said data management unit monitors a change of the capacity information sent from second computer, and sends a request for increasing the data collection interval to said second computer if a current data collection interval is smaller than a predetermined value.

6. The information processing system according to claim 5, wherein said second computer increases the data collection interval requested from said third computer and collects capacity information from said first computer based on the increased data collection interval.

7. An information processing method, which is implemented in an information processing system, the system including a storage apparatus having a plurality of storage areas, a first computer, and a second computer, wherein the first computer includes an application unit, a file system, a volume management unit, and an operating system unit, the information processing method comprising:

managing, by the file system, capacity information of said plurality of storage areas;

changing, by the file system, said capacity information based on a read/write request from said application unit;

monitoring, by said volume management unit, said capacity information to detect a change in the capacity information in said file system;

sending, by said volume management unit, a request for decreasing a data collection interval for collecting the capacity information when said change in the capacity information is detected; and collecting, by said second computer, the capacity information from said first computer at the data collection interval which is decreased based on said request received from said first computer.

8. The information processing method according to claim 7, further comprising:

sending, by said second computer, said collected capacity information to a third computer, wherein said third computer includes a storage area for storing capacity information and a data management unit.

9. The information processing method according to claim 8, further comprising:

storing, by said data management unit of said third computer, a current capacity information sent from said second computer into said storage area if said current capacity information sent from said second computer differs from the capacity information previously sent from said second computer.

10. The information processing method according to claim 9, wherein said data management unit of said third computer does not store said capacity information sent from said second computer into said storage area if said current capacity information sent from said second computer is same as the capacity information previously sent from said second computer.

11. The information processing method according to claim 8, further comprising:

monitoring, by said data management unit, a change of the capacity information sent from second computer; and sending, by said data management unit, a request for increasing the data collection interval to said second computer if a current data collection interval is smaller than a predetermined value.

12. The information processing method according to claim 11, further comprising:

increasing, by said second computer, the data collection interval requested from said third computer; and collecting, by said second computer, capacity information from said first computer based on the increased data collection interval.

* * * * *